United States Patent [19]

Wortman

[11] 4,433,215

[45] Feb. 21, 1984

[54] SOLID STATE HYBRID CIRCUITS

[75] Inventor: Donald W. Wortman, Central Islip, N.Y.

[73] Assignee: TII Corporation, Copeague, N.Y.

[21] Appl. No.: 282,056

[22] Filed: Jul. 10, 1981

Related U.S. Application Data

[63] Continuation-in-part of Ser. No. 15,407, Feb. 26, 1979, Pat. No. 4,278,847.

[51] Int. Cl.³ .............................................. H04B 1/58
[52] U.S. Cl. ................... 179/170 NC; 179/77; 179/170 T
[58] Field of Search ................ 179/16 F, 18 FA, 70, 179/77, 81 R, 170 R, 170 T, 170 NC

[56] References Cited

U.S. PATENT DOCUMENTS

| | | | |
|---|---|---|---|
| 3,909,559 | 9/1975 | Taylor | 179/170 NC |
| 3,970,805 | 7/1976 | Thomas | 179/170 NC |
| 4,041,252 | 8/1977 | Cowden | 179/170 NC |
| 4,086,447 | 4/1978 | Schindler et al. | 179/170 NC |
| 4,133,986 | 1/1979 | Picandet et al. | 179/170 NC |
| 4,272,656 | 6/1981 | Nishikawa | 179/70 |
| 4,357,495 | 11/1982 | Sweet et al. | 179/77 |

*Primary Examiner*—G. Z. Rubinson
*Assistant Examiner*—Randall P. Myers
*Attorney, Agent, or Firm*—LeBlanc, Nolan, Shur & Nies

[57] ABSTRACT

An electronic hybrid having a two-wire port adapted to be connected to a two-wire line and separate unidirectional receive and transmit ports, means for coupling signals received at said two-wire port to said transmit port, and a circuit for converting single-end signals imposed on the receive port into differential signals for application to the two-wire port.

13 Claims, 2 Drawing Figures

SOLID STATE HYBRID CIRCUITS

RELATED APPLICATION

This application is a continuation-in-part of my co-pending application Ser. No. 15,407 filed on Feb. 26, 1979 now U.S. Pat. No. 4,278,847 for Transformerless Hybrid Circuits.

FIELD OF INVENTION

This invention relates to transformerless hybrid circuits (also called electronic or solid state hybrid circuits) for coupling a pair of unidirectional signal transmission paths to a bidirectional signal transmission path in communication equipment. The present invention is particularly concerned with improvements over the circuits disclosed in my earlier application Ser. No. 15,407.

BACKGROUND

Hybrid circuits are customarily used in various places as a signal interface between a bidirectional two-wire or transmission path and the individual unidirectional sections or unidirectional transmission paths of a four-wire line. In telephone carrier systems, for example, a hybrid circuit is used as a junction between a two-wire drop or subscriber loop and a four-wire telephone carrier channel. Hybrid circuits are also used in the telephone set itself to couple the telephone's receiver and transmitter to a two-wire line.

The most commonly used hybrid circuit design is a hybrid transformer known as a hybrid coil. This type of hybrid circuit typically has a four winding transformer to provide a two-wire port, separate transmit and receive ports, and a balance network. The transformer windings are arranged in such a manner that signals imposed on the two-wire port are coupled to the transmit port and signals imposed on the receive port are coupled to the two-wire port, but not to the transmit port.

Hybrid transformers of the type described above have been in use for many years. They have, however, a number of drawbacks including relatively large size and high cost. To avoid these problems, various forms of transformerless or electronic hybrids have been proposed in the past such as the ones described in U.S. Pat. No. 4,004,109 which issued to F. S. Boxall on Jan. 18, 1977 and U.S. Pat. No. 4,064,377 which issued to J. F. Regan on Dec. 20, 1977.

In the Boxall patent signals are coupled between the two and four-wire lines by an arrangement of current mirrors. Such current mirrors, however, tend to be relatively expensive and are not readily available, low cost, off-the-shelf items.

The Regan patent avoids the use of current mirrors and hence the relatively high expense associated with such componentry. Regan's electronic hybrid circuit, however, is particularly designed for relatively high voltage supplies such as −48 VDC and is not suitable for low voltage supplies (e.g., −16 VDC) because of the voltage drops that are created by connecting terminating resistances in series with the conductors of the two-wire line. Additionally, the Regan hybrid circuit requires a carefully designed differential amplifier circuit to achieve the balance necessary for adequate common mode rejection.

The present invention has none of the foregoing drawbacks and instead is designed to be particularly suitable for use with low voltage supplies as well as affording the advantage of being manufacturable from inexpensive, off-the-shelf components. Additionally, the present invention affords several other advantages as will become apparent from the following summary and description of the invention.

SUMMARY AND OBJECTS OF INVENTION

In one illustrated embodiment the solid state hybrid comprises a pair of constant current sources which drive the conductors of the two-wire line and which are used in a circuit for converting an incoming single-ended signal into a differential signal. The source terminating impedance for the two-wire line is shunted across the two conductors of the line without being connected to a.c. ground. This circuit design has low power loss and permits the use of relatively low voltage supplies. It additionally provides for a precisely balanced differential signal on the two-wire line without requiring the careful matching of series connected terminating resistances as is the case in the Regan patent mentioned above.

The constant current sources mentioned above are advantageously in the form of inexpensive, off-the-shelf bipolar transistors which are d.c. biased to provide battery feed (i.e., d.c. loop current) to the two-wire line. By using the transistor current sources as the battery feed, the direct current conducted through the two-wire line will advantageously remain constant regardless of the length of the line within the limits of the circuit design. The hybrid circuit may therefore be used without alterations for driving two-wire drops or subscriber loops of different length since the amount of direct current delivered to the line will not be dependent upon the length of the line.

Furthermore, the input power applied to the system consisting of the two-wire line and the transformerless hybrid circuit of this invention will not change with variations or changes in the length of the two-wire line. The power supply may therefore be designed so that only the minimum power necessary is used for maximum loop length. Wasteful dissapation of power is therefore avoided.

The particular circuit design for converting the single-ended signal into the balanced differential signal also provides a cancellation signal voltage which is applied at the hybrid's unidirectional transmit port for cancelling incoming signals which are conducted through the hybrid from the unidirectional receive port to the unidirectional transmit port.

In a further embodiment incorporating the principles of this invention, the hybrid circuit is connected in a subscriber's telephone set as an interface between a two-wire central office transmission line and subscriber's microphone and earphone equipment. In this embodiment, the hybrid circuit is designed to draw operating power from the two-wire transmission line, rather than acting as a power source for the two-wire line. This is accomplished by providing two constant current sources which are driven by a portion of the central office battery or loop current (i.e., the d.c. operating current which is conducted by the two-wire transmission line from the central office). The constant current sources, in turn, drive a pair of sink current transistors which develop a sink current. A voltage developed by the sink current is compared with the midpoint of the supply or tip-to-ring voltage at the subscriber's telephone station to develop an error signal. The error signal is used to drive the sink current transistors in such a way that they develop a balanced differential audio signal from the incoming single-ended audio signal. The error signal is also used for cancelling incoming signals which are conducted through the hybrid from the unidirectional receive port to the unidirectional transmit port. This current construction has several advantages.

First, it provides an effective signal cancellation of audio signals which are conducted through the hybrid from the unidirectional receive port to the unidirectional transmit port. Second, it reduces the extent of attenuation of audio signals arriving from the central office. Third, it maintains an essentially constant d.c. current load on the two-wire transmission line regardless of the transmission line length. Fourth, it simplifies the design of the circuit.

In addition to being low in cost and reliable in operation the hybrid circuit of this invention is small in physical size and may be compactly packaged by virtue of having relatively few parts and no coils. Furthermore, it can be construed as an inexpensive integrated circuit.

In this description a single-ended signal is considered to be a signal referenced from a one-conductor line to ground or an ungrounded common return. A differential signal is considered to be the difference between two signals which are not necessarily referenced to ground.

With the foregoing in mind the general aim and purpose of this invention is to provide a novel transformerless or solid state hybrid circuit which is designed to draw operating power from a two-wire transmission line in a telephone communication system.

Another important object of this invention is the provision of a novel solid state hybrid which can be fashioned as an integrated circuit, and which is of simplified, reliable design having relatively few parts.

Another object of this invention is to provide a novel hybrid which maintains a substantially constant d.c. load current.

Further objects of this invention will appear as the description proceeds in connection with the appended claims and the below described drawings.

DETAILED DESCRIPTION

Figure 1:
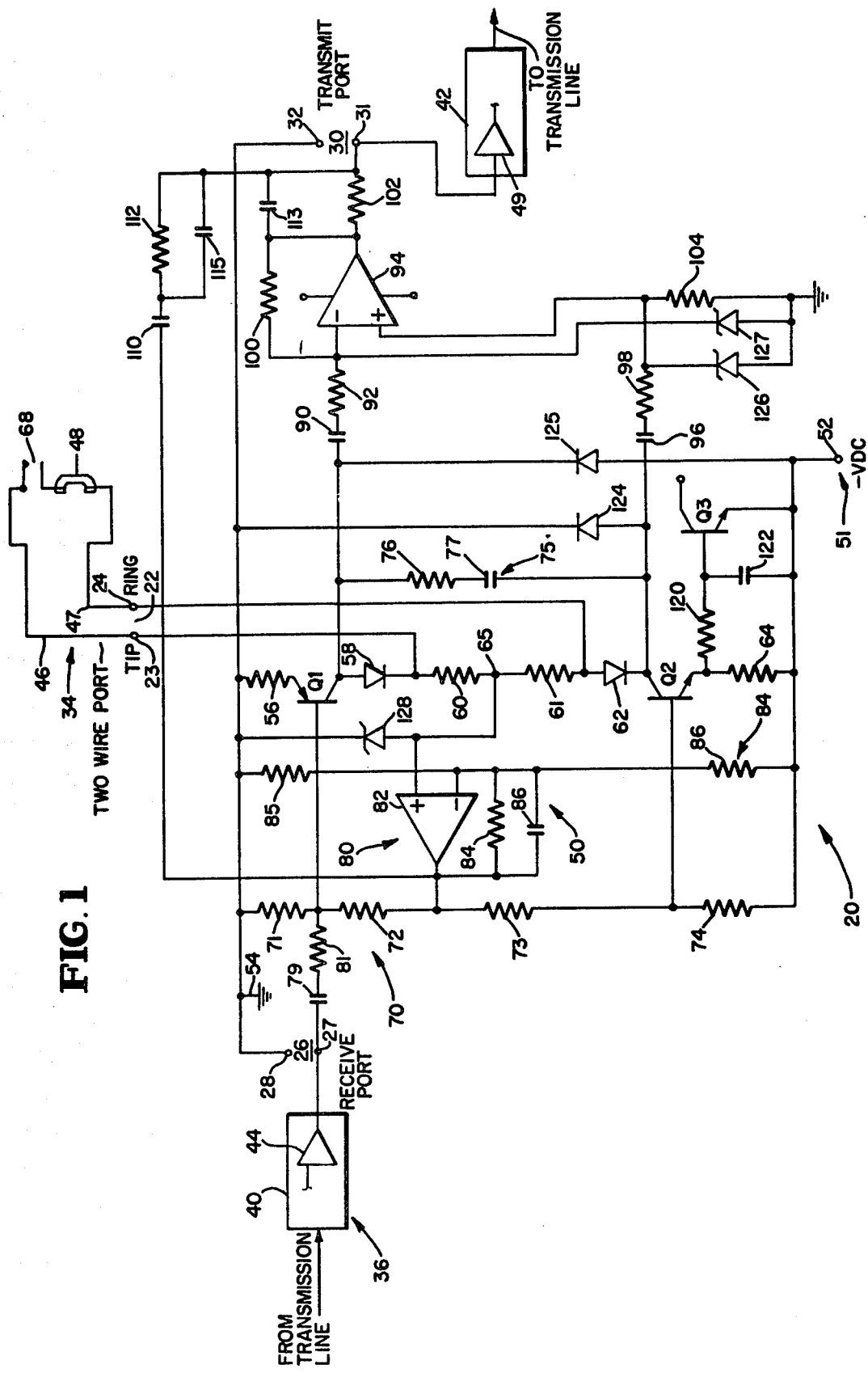
FIG. 1 is a schematic diagram of a transformerless or electronic hybrid circuit which is specifically designed for use as an interface between a subscriber drop or subscriber loop and a four-wire telephone carrier channel.

Referring to FIG. 1 one embodiment of a solid state of transformerless hybrid circuit is generally at 20 and comprises a bidirectional two-wire port 22 having terminals 23 and 24, a unidirectional single-ended receive port 26 having an ungrounded terminal 27 and a grounded terminal 28, and a unidirectional single-ended transmit port 30 having an ungrounded terminal 31 and a grounded terminal 32. Incoming signals imposed on the unidirectional receive port 26 are coupled by the hybrid circuit to the bidirectional port 22. Incoming signals received at port 22 are coupled by the hybrid circuit to the unidirectional transmit port 30, but not the receive port 26.

In the embodiment illustrated in FIG. 1 the hybrid circuit of this invention is particularly designed for use as a signal interface between a two-wire drop or line 34 and the four-wire circuit of a telephone carrier channel in a subscriber carrier system. The subscriber carrier channel comprises a subscriber terminal circuit 36 which may be the same as the one shown in FIG. 4 of the U.S. Pat. No. 4,087,639, which issued on May 2, 1978. Such a subscriber terminal circuit has a communication receiver 40 and a communication transmitter 42.

In a typical carrier system design the receiver 40 is equipped to receive a carrier signal of pre-selected frequency and to detect the received carrier signal for recovering the modulating audio or voice frequency signal. The recovered audio signal is customarily fed to an expandor 44 in receiver 40. The audio signal output of expandor 44 is usually single-ended as shown and is connected to terminal 27 to impose the single-ended audio signal on receive port 26. Hybrid circuit 20 converts this incoming, single-ended audio signal into a balanced differential signal for application as an outgoing signal to the bidirectional port 20.

The two-wire line 34, or subscriber loop as it is also called, has a pair of conductors 46 and 47, one being the tip conductor, and the other being the ring conductor. Conductors 46 and 47 are respectively connected to the terminals 23 and 24 of the bidirectional port 22. Line 34 is connected to the subscriber's telephone 48 to couple the incoming differential audio signal to the telephone.

Differential audio signals transmitted from telephone 48 are fed to the bidirectional two-wire port 22 by way of line 34. Hybrid circuit 20 couples the outgoing audio signals in single-ended form to transmit port 30.

As shown, transmit port 30 may be coupled to a compressor 49 in transmitter 42. Transmitter 42 is also equipped to modulate an outgoing carrier signal with the audio signal that is fed to the transmitter from port 30.

The carrier signals received by and transmitted from the terminal circuit 36 are transmitted by way of a two-conductor transmission line which connects to the central office channel terminal equipment in the carrier system. Transmitter 42 and receiver 40 constitute a four-wire signal transmission circuit.

As shown in FIG. 1, hybrid circuit 20 comprises a pair of constant current sources in the form of bipolar transistors Q1 and Q2, respectively. These constant current sources (Q1 and Q2) are connected in series aiding relation to drive (i.e., to feed current to) the two-wire line 34. In this embodiment transistor Q1 is of the PNP type. Transistor Q2 is of the opposite polarity, being of the NPN type.

Transistors Q1 and Q2 provide battery feed (direct current) to the two-wire line 34 and form a part of a converting circuit 50 which is connected between ports 26 and 22. Circuit 50 operates to convert the incoming single-ended signal received at port 26 into a balanced differential signal for application to port 20 and hence to the conductors of line 34.

Transistors Q1 and Q2 are considered to be constant current sources because of their high collector output impedances. Both of these transistors are driven by a suitable voltage source or supply 51 having a negative terminal 52 and an earth grounded terminal. Terminal 52 is at a.c. ground.

As shown, the emitter of transistor Q1 is connected by way of an emitter resistor 56 to earth ground at 54, and the collector of transistor Q1 is coupled by way of a diode 58, two collector resistors 60 and 61 and a further diode 62 to the collector of transistor Q2. Resistors 60 and 61 are connected in series between diodes 58 and 62. The emitter of transistor Q2 is coupled by way of an emitter resistor 64 to the negative terminal 52 of voltage source 51.

By these circuit connections it will be appreciated that conduction of transistors Q1 and Q2 results in the flow of d.c. biasing current through a path that may be traced serially from the ground at 54, through resistor 56, through the emitter and collector electrodes of transistor Q1, through diode 58, through resistors 60 and 61, through diode 62, through the collector and emitter electrodes of transistor Q2 and through resistor 64 to the negative terminal of source 51.

The emitter resistor 56 sets the collector-emitter current for transistor Q1, while the emitter resistor 64 sets the collector-emitter current for transistor Q2. Resistors 56 and 64 are preferably equally sized (i.e., of equal resistances). Resistors 60 and 61 are equally sized and are large enough so that only a small d.c. biasing current is supplied for amplifier 82.

Resistors 60 and 61 form a voltage divider to make the collector-emitter voltages of transistors Q1 and Q2 equal to each other when the voltage at junction 65 (i.e., the junction between resistors 60 and 61) is at the midpoint of the voltage supply 51.

As shown, terminal 23 is connected to the junction between diode 58 and resistor 60, and terminal 24 is connected to the junction between resistor 61 and diode 62. By these circuit connections it will be appreciated that when the telephone 48 is lifted off-hook to close its hook switch 68, transistors Q1 and Q2, will cause direct current (also referred to as battery current) to flow through conductor 46, the telephone set 48 and conductor 47.

As shown, circuit 50 includes a voltage divider 70 which is connected across ground 54 and the negative voltage supply terminal 52 to provide the d.c. bias for transistors Q1 and Q2. Voltage divider 70 comprises resistors 71, 72, 73 and 74 all connected in series between ground and terminal 52. The base of transistor Q1 is connected to the junction between resistors 71 and 72, and the base of transistor Q2 is connected to the junction between resistors 73 and 74. By these circuit connections transistors Q1 and Q2 are d.c. biased for Class A operation by the voltage divider action of the resistors in divider 70. Transistors Q1 and Q2 will therefore be on and hence conducting all of the time to provide battery feed even when no audio signals are imposed on ports 22 and 26. As soon as hook switch 68 is closed, therefore, direct current for telephone 48 will be fed through line 34.

An impedance 75 for the two-wire line 34 is connected directly across the collectors of transistors Q1 and Q2. Impedance 75 is therefore shunted across the tip and ring conductors 46 and 47 of the two-wire line without being connected to or terminating in a.c. or any other ground. Impedance 75 constitutes the terminating impedance for signals transmitted from telephone 48 to hybrid 20 and the source impedance for signals transmitted from hybrid 20 to telephone 48. As shown, impedance 75 is in parallel with the telephone handset 48 and in parallel with the series connected resistors 60 and 61.

Thus, impedance 75 is not connected in series with one or the other of the conductors of the two-wire line 34 and consequently does not result in any voltage loss in the two-wire line. Instead, impedance 75 establishes a metallic connection (i.e., a non-grounded connection) bridging conductors 46 and 47.

As shown, impedance 75 consists of a resistor 76 and a d.c. blocking capacitor 77. Resistor 76 and capacitor 77 are connected in series between the collectors of transistors Q1 and Q2. Impedance 75 is therefore in series with the transistors Q1 and Q2 and hence in series with the constant current sources defined by transistors Q1 and Q2. The value of resistor 76 is typically 910 ohms.

From the foregoing description it will be appreciated that loop current (i.e., direct current) will flow through the two-wire line 34 and hence through the telephone handset 48 upon closure of hook switch 68. The current conducting path for the loop current may be traced from ground at 54, through the emitter-collector electrodes of transistor Q1, through tip conductor 46, through the hookswitch and telephone handset 48, through ring conductor 47, and through the collector-emitter electrodes of transistor Q2 to the negative terminal 52 of voltage supply 51.

The two-wire line 34 is therefore fed by d.c. collector current from transistors Q1 and Q2 which remains constant and does not change for different lengths of the two-wire line. The loop current conducted through the two-wire drop 34 will therefore be the same for different lengths of the two-wire line and also will not vary for different values of the telephone set impedance or other load that is connected to port 22 by line 34.

By feeding line 34 with the transistor constant current sources and by connecting the impedance 75 across line 34, rather than in series with line 34, relatively low voltage supplies (e.g., −16 VDC) can be used without problems.

Furthermore, decreasing the length of line 34 does not increase power usage. In this regard the input power applied by voltage supply 51 to power the combined circuit of hybrid 20, line 34 and telephone set 48 will remain constant and will not be changed by variations in the length of line 34. The voltage supply may therefore be designed to deliver only the minimum power necessary for a predetermined maximum length of line 34.

In the embodiment shown in FIG. 1 the single-ended signal imposed on receive port 26 is coupled to the base of transistor Q1 by a capacitor 79 and a resistor 81 which are connected in series between terminal 27 and the base of transistor Q1. A negative feedback 80, forming a part of circuit 50 and having a non-inverting amplifier 82, cooperates with transistors Q1 and Q2 to convert the received single-ended signal into the balanced differential signal for driving the two-wire port 22.

A voltage divider 84 sets the voltage at the negative input of amplifier 82 at a fixed, reference value. In this embodiment, divider 84 comprises a pair of equally sized resistors 85 and 86 connected in series between ground at 54 and the voltage supply's negative terminal 52. The negative input terminal of amplifier 82 is connected to the junction between resistors 85 and 86. For this circuit design the reference voltage is therefore fixed at the midpoint of the voltage supply. If the voltage supply is −16 VDC, for example, then the reference voltage at the amplifier's negative input will be −8

VDC. It will be appreciated that the reference voltage may be set to some value other than the midpoint of the voltage supply.

The output of amplifier 82 is connected to the junction between the voltage divider resistors 72 and 73. Resistors 72 and 73 are equally sized in this embodiment. Likewise, resistors 71 and 74 are equally sized. Amplifier 82 is provided with a local feedback network having a resistor 84 and a capacitor 86 connected in parallel with each other between the amplifier's output and the amplifier's negative input.

The junction 65 between resistors 60 and 61 is directly connected to the positive or non-inverting input terminal of amplifier 82. The voltage at the positive input of amplifier 82 will therefore be the voltage at junction 65. Accordingly, the voltage at the positive input of amplifier 82 will be equal to the fixed reference voltage at the negative input of amplifier 82 when the collector-emitter voltages of transistors Q1 and Q2 are equal to each other. For a −16 volt supply, the voltage at the positive input of amplifier 82 will therefore be −8 volts and thus the same as the reference voltage when the collector-emitter voltages of transistors Q1 and Q2 are equal. The amplified voltage at the output of amplifier 82 will deviate from the midpoint of the voltage supply by a magnitude proportional to the difference between the voltages at the amplifier's positive and negative input terminals.

The emitter and collector currents of transistor Q1 are virtually equal to each other. Likewise, the emitter and collector currents of transistors Q2 are virtually equal. Because transistors Q1 and Q2 are connected in series, neither one of the transistors will be able to draw significantly more emitter current than the other. Therefore, the emitter current of transistor Q2 will be equal to the emitter current of transistor Q1 even where the betas of the transistors are unequal as in the case of unmatched transistors. Under such a condition one of the two transistors will tend to draw somewhat more base current than what is needed until the feedback 80 makes the necessary correction.

In a practical circuit where unmatched, off-the-shelf transistors are used the betas of the two transistors are normally different. As a result, the collector-emitter voltages of transistors Q1 and Q2 will be unequal before corrective action is taken by feedback 80. Considering this situation in absence of any incoming audio signals the voltage applied to the positive input of amplifier 82 will initially deviate from the midpoint of the voltage supply and will either be more positive or more negative with respect to the fixed reference voltage at the negative input of amplifier 82.

Assume as an example that the voltage at the positive input of amplifier 82 is driven more positive than the reference voltage at the negative input of amplifier 82. The voltage at the output of amplifier 82 will therefore be driven positively with respect to the fixed reference voltage at the negative input of amplifier 82 and will be at least closely proportional to the difference between the voltages at the positive and negative inputs of the amplifier. This corrective change in the voltage at the output of amplifier 82 drives the voltages at the gases of transistors Q1 and Q2 more positive by equal amounts.

Since transistors Q1 and Q2 are of opposite polarity, transistor Q1 will be forced to conduct less and transistor Q2 will be forced to conduct more to an extent needed to drive the voltage at the positive input of amplifier 82 to the fixed reference voltage (i.e., the midpoint of the voltage supply in this embodiment). Upon stabilizing, the corrective action of feedback 80 will be such that the collector-emitter voltages of transistors Q1 and Q2 will become equal or at least closely equal to each other, and the voltage applied to the positive input of amplifier 82 will closely approach the fixed reference voltage at the amplifier's negative input.

An incoming, single-ended audio signal imposed on the receive port 26 will be coupled to the base of transistor Q1, causing the transistor's base voltage to change from that value which is needed to maintain the voltage at junction 65 equal to the fixed reference voltage or midpoint of the voltage supply. The emitter current drawn by transistor Q1 will therefore attempt or tend to change in a direction depending upon the direction in which the transistor's base voltage is changed to cause the transistor's collector voltage to begin the change.

If, for example, the audio signal voltage applied to the base of the transistor Q1 is negative going with respect to the existing quiescent voltage level, then the voltage on the collector of transistor Q1 will begin to become more positive. When this happens the voltage on the collector of transistor Q2 will initially follow the voltage on the collector of transistor Q1 since the collector-emitter current drawn by transistor Q2 will not change significantly at this stage of operation.

Thus, the voltage at the non-inverting input of amplifier 82 will follow the positive increase in the voltage on the collector of transistor Q1. The voltage at the output of amplifier 82 will therefore increase in a positive direction by a magnitude proportional to the difference between the fixed reference voltage at the amplifier's negative input terminal and the voltage at the amplifier's positive input terminal.

This positive going increase in the voltage at the output of amplifier 82 is coupled back to the bases of transistors Q1 and Q2, making the base voltages for transistors Q1 and Q2 more positive by equal amounts. The positive going voltage increase at the base of transistor Q1 reduces the conductivity of Q1 and causes partial cancellation of the negative going audio signal voltage at the base of transistor Q1.

The positive going increase in the voltage on the base of transistor Q2 increases the collector-emitter current drawn by transistor Q2 by an amount closely proportional to the voltage increase at the output of amplifier 82. This increase in collector-emitter current for transistor Q2 enables the collector-emitter current drawn by transistor Q1 to increase by a corresponding amount. The result is that the collector voltage of transistor Q2 will become more negative and the collector voltage of transistor Q1 will become more positive by equal amounts to establish the balanced differential audio signal for application to the bidirectional port 22.

If, for example, the collector voltage for transistor Q2 becomes more negative by one volt, then the collector voltage for transistor Q1 will become more positive by one volt. The equal but opposite going changes in the voltages on the collectors of transistors Q1 and Q2 cause the voltage at junction 65 and hence at the non-inverting input of transistor 82 to return to or closely approach the reference voltage which in this case is the midpoint of the voltage supply 51.

For an incoming single-ended audio signal voltage that is positive going transistors Q1 and Q2 and feedback 80 will have the opposite effect of the situation just described for a negative going single-ended audio signal. For the positive going incoming signal the collector-emitter current of transistor Q1 tends to reduce, causing the voltage on the collector of transistor Q1 to begin to change negatively. As before, the voltage on the collector of transistor Q2 will initially follow the voltage on the collector of transistor Q1 before correction is effected by feedback 80. The voltage at the non-inverting input of amplifier 82 will therefore become more negative than the midpoint reference voltage at the amplifier's negative input. As a result, the voltage at the output of amplifier 82 will be driven in a negative going direction, thereby increasing the conductivity of transistor Q1 while decreasing the conductivity of transistor Q2.

Decreasing the conductivity of transistor Q2 decreases the collector-emitter current drawn by transistor Q2 and hence decreases the collector-emitter current drawn by transistor Q1. In response to a positive going single-ended audio signal, therefore, the collector voltage of transistor Q1 will become more negative and the collector voltage of transistor Q2 will become more positive, and the changes in the two collector voltages will equal but in opposite directions.

From the foregoing description it will be appreciated that feedback 80 cooperates with transistors Q1 and Q2 to develop the balanced differential audio signal voltage across the collectors of transistors Q1 and Q2. Ignoring the voltage drops across diodes 58 and 62 the tip signal voltage on tip conductor 46 will be the collector voltage of transistor Q1 and the ring signal voltage on ring conductor 47 will be the collector voltage of transistor Q2. Like the collector voltages of transistors Q1 and Q2, the tip and ring signal voltages will be opposite in phase with respect to each other to thus establish the balanced differential signal on line 34 for application to telephone 48.

It will also be appreciated that the voltage at the output of amplifier 82 will be proportional to the voltage difference across the collectors or transistors Q1 and Q2 and hence across the tip and ring conductors 46 and 47 of the two-wire line 34. The voltage at the output of amplifier 82 is therefore proportional to the differential signal voltage. This voltage, as will be described in detail shortly, is applied as a cancellation voltage to prevent the incoming single-ended audio signal which is received at port 26, from being returned to the transmit section of the four-wire circuit by way of transmit port 30.

In addition to the previously mentioned functions, circuit 50 also operates to cancel any longitudinal voltages which may be impressed upon the tip and ring conductors 46 and 47 of the two-wire line 34 without affecting the tip and ring audio signals making up the desired differential signal. The longitudinal voltages or currents appearing on conductors 46 and 47 are distinguished from the tip and ring audio signals in that they are in phase and hence of the same polarity rather than being of the opposite polarity. In other words the two longitudinal voltages appearing on the tip and ring conductors, respectively, will both go positive at the same time or will both go negative at the same time. Quite often induced 60 Hz longitudinal currents or voltages are impressed upon the conductors of line 34 in situations where line 34 is in the proximity of a power line. Such an a.c. longitudinal voltage condition is frequently referred to as 60 Hz pickup.

If longitudinal voltages are impressed upon the tip and ring conductors of line 34 the voltages on the tip and ring conductors will momentarily change or begin to change in the same direction and usually by the same amount. For example, if the longitudinal voltages impressed upon conductors 46 and 47 are positive going then the summation of voltages on each of the conductors 46 and 47 will cause the voltage at the non-inverting input of amplifier 82 to become more positive than the reference voltage. When this happens the voltage at the output of amplifier 82 becomes more positive by an amount proportional to the longitudinal voltages, thus causing transistor Q2 to conduct more and transistor Q1 to conduct less.

The amount of collector current drawn by transistor Q2 will therefore increase to cancel the longitudinal current on the ring lead 47. At the same time the collector current drawn by transistor Q1 will decrease to cancel the longitudinal current on the tip lead 46.

If the longitudinal voltages on the tip and ring conductors 46 and 47 are negative going, rather than positive going, the voltage at the non-inverting input of amplifier 82 will become more negative than the referencing midpoint of voltage supply 51. This causes transistor Q1 to conduct more and transistor Q2 to conduct less. Transistor Q1 will therefore draw more collector current while transistor Q2 will draw less collector current, thereby cancelling the unwanted longitudinal signals.

From the foregoing description it will be appreciated that in absence of any longitudinal voltages on the tip and ring conductors 46 and 47, transistors Q1 and Q2 will be maintained in balance by feedback 80 such that both transistors draw equal or substantially equal collector currents to make the collector-emitter voltages of the two transistors equal to each other. However, when longitudinal voltages appear on the conductors of the two-wire line 34 the collector currents for transistors Q1 and Q2 will change in opposite directions, thus causing the collector voltages of the two transistors to attempt to change in the direction opposite to the impressed longitudinal voltages. Circuit 50 therefore establishes an effective zero impedance from the tip and ring conductors to ground for longitudinal voltages (i.e., voltages of the same polarity), but not for the audio voltages of opposite polarity.

The audio signal transmitted from the telephone handset 48 will appear as 180° out-of-phase audio voltages on the tip and ring conductors 46 and 47, respectively. The audio signal on the tip conductor 46 is coupled through diode 58, a d.c. blocking capacitor 90 and an amplifier input resistor 92 to the negative input of a differential amplifier 94. The audio signal on the ring conductor 47 is coupled through diode 62, a d.c. blocking capacitor 96 and an input resistor 98 to the positive input of amplifier 94. By these connections it will be appreciated that amplifier 82 is differentially coupled to the two-wire port 22 and hence to the two-wire line 34.

The output of amplifier 94 is fed through an output resistor 102 to the ungrounded terminal 31 of transmit port 30. A local feedback for amplifier 94 comprises a resistor 100 connected between the amplifier's negative or inverting input and the amplifier's output terminal as shown.

In the illustrated embodiment amplifier 94 is an operational amplifier configuration in which the voltage gain for the ring signal between the amplifier's non-inverting input and the amplifier's output is not the same as the voltage gain for the tip signal between the amplifier's inverting input and the amplifier's output, the former being one plus the quotient of the feedback resistance (resistor 100) divided by the input resistor (resistor 92), and the latter being simply the quotient of the feedback resistance (resistor 100) divided by the input resistance (resistor 92). To compensate for this gain difference a further resistor 104 is connected between the non-inverting input of amplifier 94 and earth ground to establish a voltage divider with resistor 98. The divider established by resistors 98 and 104 divides down the ring signal voltage and thereby has the effect of attenuating the ring signal. With this circuit design, appropriate selection of resistance values for resistors 92, 98 and 104 equalizes the voltage gains for the tip and ring signals.

Being of the differential type, amplifier 94 will only amplify difference between the input voltages at its inverting and non-inverting terminals, respectively. Amplifier 94 therefore responds to the incoming tip and ring signal voltages since they are 180° out-of-phase with each other. The voltage at the output of amplifier 94 will be equal or proportional to the sum of the absolute magnitudes of the applied tip and ring signal voltages. Amplifier 94 thus has the effect of converting the differential audio signal which is transmitted from telephone 48 into a single-ended drive for transmit port 30.

Because amplifier 94 is differentially coupled to the two-wire line it will be insensitive to longitudinal and other in-phase currents to thereby provide effective longitudinal rejection. More specifically, in-phase longitudinal currents or voltages, being of the same polarity, will not result in any voltage change at the output of amplifier 94 and consequently will not be applied to the transmit port 30 for conduction to transmitter 42.

Since most if not all of the longitudinal voltages appearing on the tip and ring conductors 46 and 47 are cancelled by feedback 80, a precise balance at the input of amplifier 94 is not required to achieve common mode or longitudinal rejection. As a result, the input circuitry for amplifier 94 may be simplified as shown.

From the foregoing it will be appreciated that two differential signals are applied to the two-wire line 34, one being for transmission from port 22 to telephone 48 and the other being for transmission from telephone 48 to port 22. In the following description the differential signal which is applied for transmission from port 22 to telephone 48 and which is developed by the incoming single-ended signal is identified as the outgoing differential signal. The other differential signal which is transmitted from telephone 48 to port 22 is identified as the incoming differential signal.

Since the input terminals of amplifier 94 are coupled to the collectors of transistors Q1 and Q2, the outgoing differential signal, which is developed by application of a single-ended audio signal at the base of transistor Q1, will be applied to amplifier 94 as well as to line 34. Amplifier 94 therefore develops an output signal voltage component proportional to the outgoing differential signal. The voltage developed at the output of amplifier 82, however, is used to cancel the differential amplifier output voltage which results from the outgoing differential signal, thereby preventing incoming signals received at port 26 and converted into a differential signal from being coupled into transmitter 42.

The foregoing voltage cancellation is accomplished by connecting the output of amplifier 82 through a capacitor 110 and a resistor 112 to terminal 31 of transmit port 30. The voltage at the output of amplifier 82 is therefore coupled through capacitor 110 and resistor 112 to terminal 31. Terminal 31 is established as a current summing point or node by being connected to the input of a summing amplifier such as the amplifier used in compressor 49.

From the previous description it will be recalled that for a given terminating impedance 75 and telephone set impedance, the signal voltage at the output of amplifier 82 will be proportional to the different signal voltage which is established across the tip and ring conductors 46 and 47 by the incoming single-ended signal voltage. Furthermore, the signal voltage at the output of amplifier 82 will be at least approximately opposite in phase with respect to the voltage component developed at the output of differential amplifier 94 in response to the outgoing differential signal voltage. Resistor 112 is sized to make the cancelling current which is applied by amplifier 82 to terminal 31 closely equal in absolute magnitude to the differential amplifier output signal current which is developed at terminal 31 by the outgoing differential signal voltage (i.e., the differential signal which is produced by the incoming single-ended signal at port 26).

Capacitor 110, resistor 102, resistor 112 and two additional capacitors 113 and 115 combine to form a phase adjusting network. Capacitors 110 and 115 adjust the phase of current through resistor 112. Capacitor 113 adjusts the phase of current through resistor 102. The current phase adjustments are such that the cancelling voltage at terminal 31 is at least closely 180° out-of-phase with respect to the differential amplifier output voltage to be cancelled even though the impedance of the telephone and various lengths of drop cable change considerably with frequency. Effective cancellation of the undesired differential amplifier output voltage component which results from the outgoing differential signal is therefore achieved at transmit port 30 to prevent the undesired signal from being returned through the transmit portion of the four-wire line that is connected to hybrid 20.

From the preceding description it will be noted that amplifier 82 does not respond to the incoming differential signal which originate at telephone 48, but instead responds to the change that is brought about by the application of the single-ended audio signal to the base of transistor Q1. In this regard it will be observed that neither of the incoming or outgoing differential signals alone will cause the voltage at the non-inverting input of amplifier 82 to change because the tip and ring signal voltages making up each differential signal will be equal in absolute magnitude and 180° out-of-phase with respect to each other.

Accordingly, the cancelling voltage developed by amplifier 82 at terminal 31 will not be dependent on and will not be changed by the incoming tip and ring signals which originate at telephone 48 and which are fed to amplifier 94 by way of line 34. Thus, the cancelling voltage supplied by amplifier 82 will not cancel the signal voltage that is developed at the output of amplifier 94 by the tip and ring signals which are fed to amplifier 94 from telephone 48. Audio signals originating at telephone 48 will therefore be fed to transmitter 42 by way of the transmit port 30.

It will be noted that the differential signal which is produced as a result of the application of the incoming single-ended signal to the base of transistor Q1 will vary as a function of and hence depend upon the value of the impedance 75 and the value of the off-hook impedance established by telephone 48 across the tip and ring conductors as well as being a function of the level of the incoming single-ended signal. The output voltage developed by the differential amplifier 94 in response to this outgoing differential signal will be a corresponding function of the same factors. It therefore is preferable to use the output of amplifier 82 as the cancelling voltage rather than using the incoming single-ended signal directly.

With the hybrid circuit of this invention loop current supervision for the two-wire line 34 is readily accomplished by the addition of a transistor Q3 as shown in FIG. 1. The emitter of transistor Q2 feeds the base of transistor Q3 through a base resistor 120. A capacitor connected between the base of transistor Q3 and the negative terminal 52 of the voltage supply 51 maintains the base of transistor Q3 at a.c. ground. The emitter of transistor Q3 is connected directly to the voltage supply's negative terminal 52. The output is taken from the collector of transistor Q3. In this embodiment transistor Q3 is of the PNP type.

When the telephone set 48 is on-hook to open hook switch 68, only a small amount of direct current will flow through the series connected transistors Q1 and Q2 and through resistor 64 with the result that a relatively small voltage drop will occur across resistor 64, making the voltage at the base of transistor Q3 sufficiently negative to turn off the transistor. When telephone 48 is brought off-hook to close hook switch 68 the telephone set establishes a relatively low bypassing impedance around resistors 60 and 61.

As a result, a relatively large direct current flows through the two-wire line or loop 34 and through resistor 64 to thereby increase the voltage drop across resistor 64. This makes the voltage at the base of transistor Q3 much less negative to a sufficient extent to turn on the transistor. In this manner, transistor Q3 monitors the loop current (i.e., direct current) in the two-wire line 34. For carrier system operation the on-off operation of transistor Q3 may be used for supplying dialing information and on and off hook information back to the central office.

Diodes 58 and 62 and two additional diodes 126 and 127 provide protection against transients due to lightening and the like. Zener diodes 126 and 128 prevent the voltages at the inverting and non-inverting input terminals of amplifier 94 from exceeding a predetermined or pre-selected level. A further zener diode 128 prevents the voltage at the non-inverting input of amplifier 82 from exceeding a predetermined level.

Figure 2:
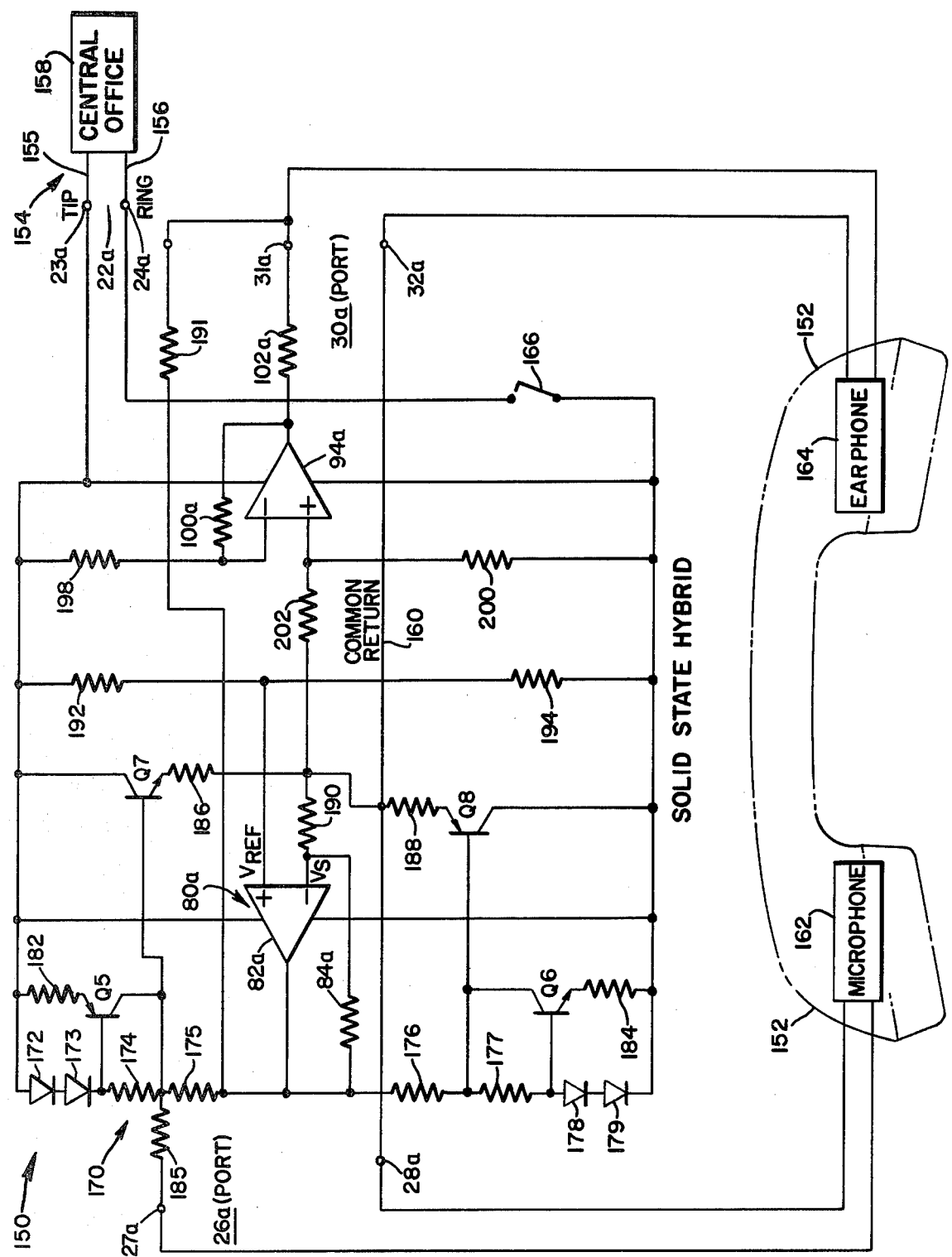
FIG. 2 is a schematic diagram of a further embodiment incorporating the principles of this invention and designed as an interface between a two-wire central office transmission line and subscriber's telephone handset.

In the embodiment shown in FIG. 2, the solid state hybrid incorporating the principles of this invention is generally indicated at 150 and is connected to the subscriber's end of a two-wire central office transmission line 154 and the subscriber's telephone set as a signal interface between line 154 and the microphone and earphone equipment in the subscriber's handset 152. To the extent that the embodiments of FIGS. 1 and 2 are alike, like reference characters have been applied to designate like parts, except that the common reference characters used for the embodiment of FIG. 2 have been suffixed by the letter "a" to distinguish them from the reference characters used in FIG. 1.

As shown in FIG. 2, the two-wire transmission line 154 has a pair of conductors 155 and 156, the former being the tip conductor and the latter being the ring conductor. Conductors 155 and 156 respectively connect to terminals 23a and 24a of the bidirectional port 22a for bidirectionally conducting audio or voice frequency signals between port 22a and a central office 158.

Terminals 28a and 30a are internally connected together by a common return conductor 160. The common return 160 is not necessarily grounded and may instead be floating.

Terminals 27a and 28a of port 26a are connected to a microphone 162 in handset 152 so that audio signals from microphone 162 are fed to port 26a. Terminals 31a and 32a of port 30a are connected to an earphone 164 in handset 152 and/or to a speaker (not shown) so that outgoing audio signals are fed from port 30a to the earphone, speaker or some other signal-receiving load (not shown).

The telephone hook switch is indicated at 166 and is connected in the ring side between terminal 24a and the remainder of the hybrid circuit 150 so that power is applied to the solid state hybrid only when hook switch 166 is closed by transferring handset 152 to its off-hook state. As compared with the embodiment of FIG. 1, hybrid circuit 150 draws d.c. operating power from the two-wire line, rather than acting as a power supply for the two-wire line. The power for hybrid 150 is supplied by a power supply at the central office or other remote terminal.

Differential voice frequency signals from central office 158 are transmitted by way of transmission line 154 to the two-wire port 22a. Hybrid circuit 150 converts these incoming differential signals into single-ended signals which are fed by way of transmit port 30a to the telephone's earphone 164. Single-ended signals originating at the telephone's microphone 162 and received at receive port 26a are converted by hybrid 150 into differential signals which are fed to the bidirectional port 22a for transmissions over line 154 to central office 158.

Still referring to FIG. 2, hybrid 150 comprises a pair of constant current sources in the form of bipolar transistors Q5 and Q6, respectively. Hybrid 150 additionally includes a second pair of bipolar transistors Q7 and Q8 which form a part of the circuit for converting the incoming audio signals arriving at port 26a into balanced differential audio signals. Transistors Q5 and Q6 provide base bias to transistors Q7 and Q8, respectively, and are considered to be constant current sources because of their high collector output impedances. In the embodiment illustrated in FIG. 2, transistors Q5 and Q8 are of the PNP type and transistors Q6 and Q7 are of the NPN type.

A voltage divider 170 is bridged across tip and ring terminals 23a and 24a and, hence, across tip and ring conductors 155 and 156 to supply base bias for transistors Q5 and Q6. Voltage divider 170 comprises a first pair of diodes 172 and 173, four resistors 174, 175, 176 and 177 and a second pair of diodes 178 and 179, all connected in series in the order mentioned between terminals 23a and 24a. Resistors 174 and 177 are equally sized. Likewise, resistors 175 and 176 are equally sized.

The base of transistor Q5 is connected to the common junction between diode 173 and resistor 174, and the emitter of transistor Q5 is connected through an emitter resistor 182 to tip terminal 23a. Similarly, the base of transistor Q6 is connected to the common junction between diode 178 and resistor 177, and the emitter of transistor Q6 is connected through an emitter resistor 184 to the ring terminal 24a. The collector of transistor Q5 is connected directly to the base of transistor Q7 and to the common junction between resistors 174 and 175.

Similarly, the collector of transistor Q6 is connected to the base of transistor Q8 and to the common junction between resistors 176 and 177.

The collectors of transistors Q7 and Q8 are respectively connected to tip terminal 23a and ring terminal 24a. The audio signal supplied by microphone 162 is coupled to the base of transistor Q7 by an impedance 185 which may or may not be separate from microphone 162. The junction between impedance 185 and the base of transistor Q7 is connected to the common junction between resistors 174, 175. The emitters of transistors Q7 and Q8 are respectively connected through emitter resistors 186 and 188 to the common return conductor 160.

It will be appreciated that the common return 160 may simply be a common junction such as a pin. Thus, the emitters of transistors Q7 and Q8 are coupled together by the series connected emitter resistors 186 and 188, and common junction between resistors 186 and 188 is connected to the common return 160. This common junction and, hence, the common return are connected through a resistor 190 to the inverting input terminal of amplifier 82a. The output of amplifier 82a is connected to the common junction between resistors 175 and 176 and also through a resistor 191 to terminal 31a. This connection depends on characteristics of the signal-receiving load.

The non-inverting input of amplifier 82a is connected to the common junction between a pair of resistors 192 and 194 which are connected in series across terminals 23a and 24a in parallel relation to the current conducting path through transistors Q7 and Q8. The connections of amplifier 82a provide the negative feedback 80a which cooperates with transistors Q7 and Q8 to convert an incoming single-ended audio signal into a differential audio signal.

Resistors 192 and 194 are equally sized, each being 450 ohms to collectively define the standard 900 ohm a.c. terminating impedance for transmission line 154. Although transistors Q7 and Q8 place an impedance in parallel with resistors 192, 194 the resulting impedance value of the parallel combination does not reduce the actual terminating impedance significantly because of high a.c. impedance which transistors Q7 and Q8 present to line 154.

Resistors 186 and 188 are equally sized. Resistors 182 and 184 are also equally sized.

From the circuit connections thus far described it will be appreciated that when hook switch 166 is closed by transferring the subscriber's telephone to its off-hook state, central office battery current from the central office battery or other d.c. source (not shown) will be conducted through voltage divider 170 by way of transmission line 154. As a result, transistors Q5 and Q6 will be biased into conduction to supply base bias to transistors Q7 and Q8, respectively. Transistors Q7 and Q8 will therefore be driven into conduction to complete a circuit for conducting the central battery current through a path that may be serially traced from conductor 155 through the collector and emitter electrodes of transistor Q7, through resistors 186 and 188 and through the emitter and collector electrodes of transistor Q8 to conductor 156.

When hook switch 166 is closed, current supplied from line 154 will also be serially conducted through resistors 192 and 194. The resulting voltage at the common junction between resistors 192 and 194 to ground will be at the midpoint of whatever supply voltage (tip to ring) is developed across the tip and ring terminals 23a and 24a by the d.c. current flow through the transmission line conductors 155, 156. This midpoint voltage is used as a reference voltage $V_{REF}$ for amplifier 82a.

If the collector currents of transistors Q7 and Q8 are of equal magnitude then the voltage $V_s$ established at the common return 160 by current flow through transistors Q7 and Q8 will be equal to the reference voltage $V_{REF}$. For this condition, the output of amplifier 82a will remain at the reference voltage and thus will not adjust the conductivity of either transistor Q7 or transistor Q8.

If the collector currents of transistors Q7 and Q8 become unequal, as is the case of applying an audio signal to the base of transistor Q7, the voltage $V_s$ will initially deviate from the reference voltage $V_{REF}$, and the output voltage of amplifier 82a will change in a direction opposite to the deviation and by an amount proportional to the difference between voltages $V_s$ and $V_{REF}$. This corrective change in the amplifier output may be regarded as an error voltage and will cause one of the two transistors Q7 and Q8 to conduct more and the other two of the transistors Q7 and Q8 to conduct less in such a way that the transistors' collector currents again become equal to each other, thus causing voltage $V_s$ to stabilize at a value that closely approaches or equals the reference voltage $V_{REF}$. Amplifier 82a thus controls transistors Q7 and Q8 in the same way that amplifier 80 controls transistors Q1 and Q2 in the preceding embodiment. Amplifiers 82a and 82 perform the same function.

When a single-ended signal (or a balanced signal, for that matter) is received at port 26a and applied to the base of transistor Q7, the extent to which transistor Q7 conducts changes, thus changing voltage $V_s$ by changing the voltage from tip to the common return 160 relative to the voltage from ring to the common return. The resulting deviation of voltage $V_s$ from reference voltage $V_{REF}$ causes amplifier 82 to develop the previously described output error voltage which is opposite to the single-ended input signal voltage. This cause a rebalancing of the voltages across the tip and common return and accross the ring and common return. The result is that the collector voltages of transistors Q7 and Q8 will change in opposite directions by equal amounts to establish the balanced differential audio signal across the collectors of transistors Q7 and Q8 and hence across the tip and ring terminals 23a and 24a. This operation for converting the single-ended signal into a balanced functionally corresponds to the conversion operation described for the preceding embodiment.

From the description thus far it is clear that transistors Q7 and Q8 operate as current sinks to supply a sink current which develops the midpoint voltage $V_s$. In addition to defining the terminating impedance, resistors 192 and 194 perform a voltage sensing function by sensing the midpoint of whatever supply voltage is applied across the tip and ring terminals 23a and 21a. Thus, the circuit of FIG. 2 has the effect of comparing the current sink voltage $V_s$, which is developed by the sink current through transistors Q7 and Q8, with voltage $V_{REF}$, which is the sensed midpoint of the applied supply voltage. This operation provides exceptionally good control over the sink current because the applied supply voltage at port 22a and hence voltage $V_{REF}$ will vary as a function of the length of transmission line 154 as well as with the audio signals arriving at port 22a from the central office.

The constant current source transistors Q5 and Q6 have the effect of reducing sink current variations due to variations in the voltage across the tip and ring terminals 23a and 24a. The overall result is reduced attenuation of central office-transmitted audio signals, the maintenance of an essentially constant load current on line 154 over a wide range of transmission line lengths, a simplified circuit design which can be implemented in the form of an integrated circuit, and an effective cancellation of the incoming audio signal which is imposed on port 26a and sensed by the differential amplifier 94a. In an integrated circuit design it will be appreciated that various resistors in circuit 150 would typically be replaced by transistor combinations.

As shown in FIG. 2, the tip terminal 23a is coupled through a resistor 198 to the inverting input of amplifier 94a, and the ring terminal 24a is coupled through another resistor 200 to the non-inverting input of amplifier 94a. The size of resistor 198 is balanced by the combination of resistor 200 and a further resistor 202 which is connected between the common return and the non-inverting input of amplifier 94a.

By the foregoing circuit connections it will be appreciated that amplifier 94a is differentially coupled to the two-wire port 22a and hence to transmission line 154 to sense the differential signal arriving at port 22a from the central office. The output voltage of amplifier 94a will therefore be equal or proportional to the magnitude of the difference signal voltage between tip and ring. Amplifier 94a thus has the effect of converting the incoming, central office differential signal into a single-ended signal which is applied to port 30a for driving earphone 164.

Because of the connections of amplifier 94a to terminals 23a and 24a it will also sense and respond to the outgoing differential signals which are applied to port 22a for transmission to the central office. The voltage developed at the output of amplifier 82a is used to cancel the differential amplifier output signal voltage component which results from the outgoing differential signal in a manner similar to that described for the embodiment of FIG. 1.

As shown in FIG. 2, the d.c. power terminals of amplifiers 82a and 94a are connected to the tip and ring terminals 23a and 24a so that both amplifiers are powered by the central office battery current which is conducted over transmission line 154 to the hybrid. Because this supply voltage has audio signals superimposed on it, these amplifiers must necessarily have good power supply rejection characteristics such as most good performance integrated circuit operational amplifiers have.

From foregoing description it also will be appreciated that amplifier 82a operates to develop a second single-end signal at the base of transistor Q8, this second single-end signal being equal but opposite in phase to the single-ended signal which is applied to the base of transistor Q7. Transistor Q7 responds to single-ended signal on its base to develop one of the two differential signal components on its collector, and transistor Q8 responds to the single-ended signal on its base to develop the other of the two differential signal components on its collector.

The sink current conducted through transistor Q7, resistors 186, 188 and transistor Q8 is maintained constant by the constant current source transistors Q5 and Q6 regardless of variations in the applied supply voltage across the tip and ring terminals 23a and 24a within the design limits of hybrid 150. The magnitude of the applied supply voltage across the tip and ring terminals 23a and 24a may therefore vary over a relatively wide range without causing a variation in the sink current mentioned above. The applied supply voltage will vary due to different transmission line lengths and also to different audio levels of the differential signal. An important advantage of maintaining the sink current constant is that the central office power requirements may be reduced regardless of the transmission line length within the design limits of the hybrid circuit.

In the absence of an audio signal at port 26a, the constant current source transistors Q5 and Q6 maintain a constant voltages on the bases of their associated sink transistors Q7 and Q8. The constant base voltage on each sink transistor maintains a constant voltage on the sink transistor's emitter.

By maintaining the emitter voltage constant for each of the two sink transistors Q7, Q8, the voltage drop across each of the two emitter resistors 186, 188 is held constant. The emitter current for each of the two sink transistor is therefore held constant, and since the collector current nearly equals the emitter current, then the collector current of each sink transistor will be maintained constant. As previously noted the common collector current for transistors Q7 and Q8 is the sink current.

Finally, it will be appreciated that transistors Q5 and Q6 maintain high a.c. impedances on the collectors of transistors Q7 and Q8, respectively.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An electronic hybrid for coupling a two-wire signal transmission line to a signal source and to a signal-receiving load in a communication system, said electronic hybrid comprising a two-wire port adapted to be electrically connected to said two-wire line for receiving incoming differential information signals from said line, a signal transmit port adapted to be electrically connected to said signal-receiving load, a signal receive port adapted to be electrically connected to said signal source for receiving signals from said source, means connected intermediate said two-wire port and said transmit port for converting the received incoming differential information signals into first single-ended signals and for applying said single-ended signals to said transmit port for transmission to said signal-receiving load, first and second transistors, means for applying second single-ended signals received at said receive port to said first transistor, means electrically connected to and cooperating with said first and second transistors for converting the second single-ended signals applied to said first transistor into outgoing balanced differential signals each having one signal component on a preselected electrode of said first transistor and the other signal component on a preselected electrode of said second transistor, said preselected electrodes of said first and second transistors being electrically connected to said two-wire port for applying the outgoing differential signal thereto for transmission over said line, and further means electrically connected to said first and second transistors for maintaining a high a.c. output impedance on said preselected electrodes of said transistors.

2. The electronic hybrid defined in claim 1 wherein said further means comprises constant current source means.

3. The electronic hybrid defined in claim 1 wherein said transistors are biased by direct current conducted by said transmission line and originating from a d.c. power supply source which is connected to said line.

4. The electronic hybrid defined in claim 3, including a terminating impedance for said transmission line, said terminating impedance being connected across the terminals of said two-wire port, and the output impedances of said transistors being connected in series with each other in a circuit that is connected in parallel with said terminating impedance.

5. An electronic hybrid for coupling a two-wire signal transmission line to a signal source and to a signal-receiving load in a communication system having a d.c. power source connected to said line remote from said electronic hybrid for powering said electronic hybrid, said electronic hybrid comprising a two-wire port adapted to be electrically connected to said two-wire line for receiving incoming differential information signals from said line, a signal transmit port adapted to be electrically connected to said signal-receiving load, a signal receive port adapted to be electrically connected to said signal source for receiving signals from source, means connected intermediate said two-wire port and said transmit port for converting the received incoming differential information signals into first single-ended signals and for applying said single-ended signals to said transmit port for transmission to said signal-receiving load, first and second transistors, means for applying second single-ended signals received at said receive port to said first transistor, further means electrically connected to and cooperating with said first and second transistors for converting the second single-ended signals applied to said first transistor into outgoing balanced differential signals each having one signal component on a preselected electrode of said first transistor and the other signal component on a preselected electrode of said second transistor, said preselected electrodes of said first and second transistors being electrically connected by said two-wire port to separate conductors of the two-wire line for applying the outgoing differential signal thereto for transmission over said line, said further means including a first constant current source electrically connected to said first transistor for supplying biasing current to said first transistor, a second constant current source distinct from said first constant current source and electrically connected to said second transistor for supplying biasing current to said second transistor, said first and second constant current sources being electrically connected by said two-wire port to said line and being powered by the direct current conducted by said line from said d.c. power source.

6. The electronic hybrid defined in claim 5 wherein said first and second transistors are of the bipolar type, and wherein said pre-selected electrodes are the collectors of said first and second transistors.

7. The electronic hybrid defined in claim 6 wherein said first constant current source comprises a third transistor, wherein said second constant current source comprises a fourth transistor, and third and fourth transistors being of the bipolar type, said third and fourth transistors being electrically connected to said two-wire port to be biased into conduction by the direct current which is conducted by said transmission line from said d.c. power source, said third transistor having its collector connected to supply base biasing current to said first transistor for driving said first transistor into conduction, and said fourth transistor having its collector connected to supply base biasing current to said second transistor to drive said second transistor into conduction.

8. The electronic hybrid defined in claim 6 wherein the direct current conducted by said transmission line establishes a supply voltage across the terminals of said two-wire port, and wherein said further means comprises a first circuit connected to said first and second transistors for developing a first voltage which varies as a function of any difference between the collector currents of said first and second transistors, a second circuit connected to said two-wire port for developing a second voltage that varies as a function of said supply voltage, an amplifier electrically connected to said first and second circuits for developing an output voltage that varies as a function of the difference between said first and second voltages, and means coupling the output of said amplifier to the bases of said first and second transistors for varying the collector currents of said first and second transistors as a function of the derivation of said output voltage from a predetermined value.

9. The electronic hybrid defined in claim 8 wherein said first circuit comprises a resistive voltage divider interconnecting the emitters of said first and second transistors.

10. The electronic hybrid defined in claim 9 wherein said first voltage is developed at a node in said voltage divider, said node being connected to a common return, one terminal of said receive port and one terminal of said transmit port being connected to said common return.

11. The electronic hybrid defined in any one of the preceding claims 8–10 wherein said second circuit comprises resistor means connected across the terminals of said two-wire port and defining the terminating impedance for said transmission line.

12. A terminating electronic hybrid for coupling a two-wire signal transmission line to a signal source and to a signal-receiving load in a communication system in which said transmission line is connected to a d.c. power supply source to conduct the direct current which powers said terminating electronic hybrid, said electronic hybrid comprising a two-wire port adapted to be connected to said line for receiving incoming differential information signals from said line, a signal transmit port adapted to be electrically connected to said signal-receiving load, a signal receive port adapted to be electrically connected to said signal source for receiving signals from said source, means connected intermediate said two-wire port and said transmit port for converting the received incoming differential information signals into first single-ended signals and for applying said single-ended signals to said transmit port for transmission to said signal-receiving load, a circuit connected intermediate said receive port and said two-wire port for converting a single-ended signal received at said receive port into an outgoing differential signal and for applying the outgoing differential signal to said two-wire port for transmission over said transmission line, a portion of said circuit being connected across the terminals of said two-wire port to conduct direct current which is supplied by said line from said d.c. power source, the direct current conducted by said line being effective to develop a d.c. supply voltage across the terminals of said two-wire port to power said circuit, and said circuit including means for maintaining the direct current conducted through said portion of said circuit substantially constant regardless of variations in said d.c. supply voltage within the design limits of said circuit.

13. The terminating electronic hybrid defined in claim 12 wherein said means in said circuit comprises constant current source means.

* * * * *

UNITED STATES PATENT AND TRADEMARK OFFICE
CERTIFICATE OF CORRECTION

PATENT NO. : 4,433,215

DATED : February 21, 1984

INVENTOR(S) : DONALD W. WORTMAN

It is certified that error appears in the above-identified patent and that said Letters Patent is hereby corrected as shown below:

Column 7, line 62, change "gases" to --bases--.

Claim 8, column 20, line 29 change "derivation" to --deviation--.

Signed and Sealed this

Twenty-ninth Day of October 1985

[SEAL]

Attest:

DONALD J. QUIGG

Attesting Officer

Commissioner of Patents and Trademarks—Designate